(No Model.)

W. R. LOW.
HARVESTER REEL.

No. 246,168. Patented Aug. 23, 1881.

Witnesses
W. C. Corliss
Jno. C. MacGregor

Inventor
William R. Low
By [signature]
Attorneys

UNITED STATES PATENT OFFICE.

WILLIAM R. LOW, OF SANDWICH, ILLINOIS.

HARVESTER-REEL.

SPECIFICATION forming part of Letters Patent No. 246,168, dated August 23, 1881.

Application filed January 29, 1881. (No model.)

*To all whom it may concern:*

Be it known that I, WILLIAM R. LOW, a citizen of the United States, residing at Sandwich, in the county of De Kalb and State of Illinois, have invented certain new and useful Improvements in Harvester-Reels, which are fully set forth in the following specification, reference being had to the accompanying drawings, in which—

Figure 1:
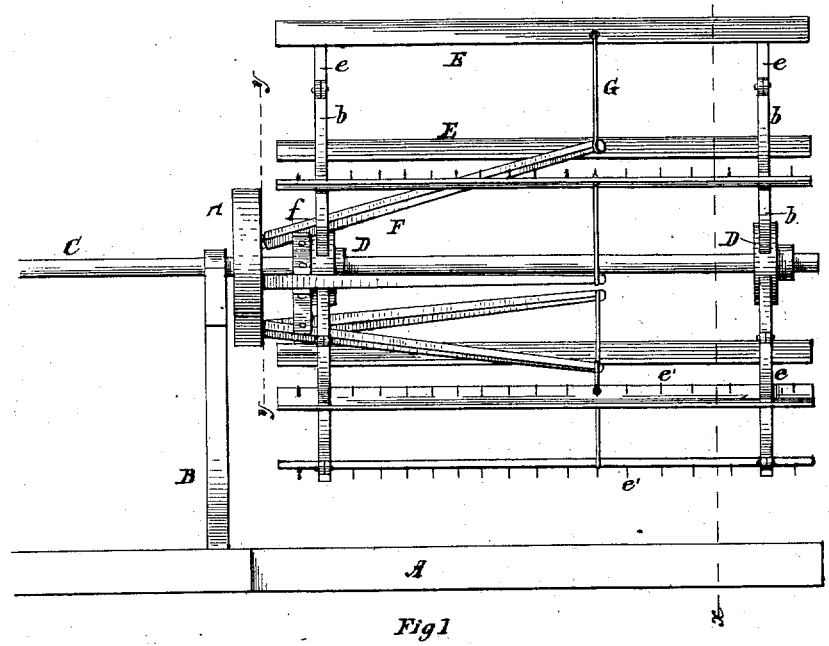
Figure 2:
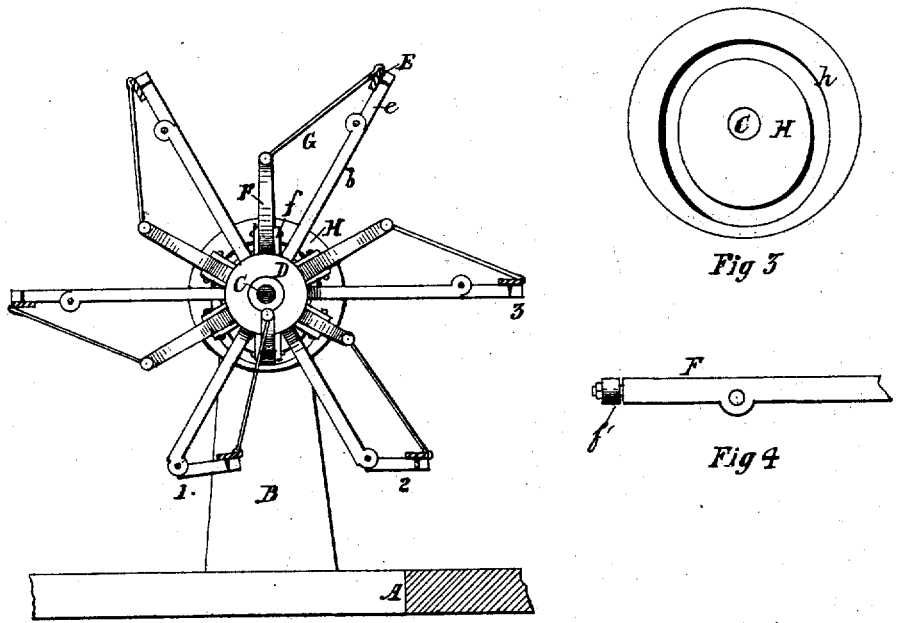
Figure 3:
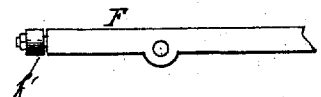
Figure 4:
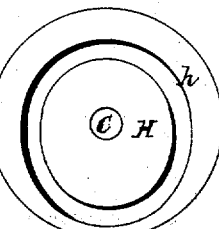

Figure 1 represents a front elevation of a reel embodying my improvements; Fig. 2, a transverse section of the same, taken on the line $x\ x$, Fig. 1; Fig. 3, an elevation of the cam for controlling the reel-arms; and Fig. 4, a detail view, showing the inner portion of one of the hinged controlling-arms detached.

My invention relates to that class of harvester-reels generally known as "horizontal" reels, the popular form of which is the well-known overhung reel, to which, preferably, my improvement is to be applied, though it is not restricted to this particular style of reel, but may be applied with equal readiness to those reels in which the shaft is supported at both ends.

It is well known that the horizontal reel has great advantages in lightness and simplicity of construction, and also that there are certain disadvantages attending its use, owing to the fact that the reel-arms must descend upon the short arc to the cutters of the harvester and immediately ascend in rear of the cutters on a similar arc. The reel-arms, therefore, do not gather the grain to the cutters, especially if it is lodged or crinkled, so well as the well-known revolving rake and reel in which the arms are caused to sweep in toward the cutters on about an even plane therewith. When the reel-arms leave the grain deposited on the platform in rear of the cutters their sharp elevation leaves the butts so far in advance as to interfere with the proper continuous laying of the grain on the platform, and this difficulty exists even with the combined rake and reel, unless the cams are so arranged as to carry the arms back a little from the cutting apparatus on the same level.

It is the object of my invention to obviate these difficulties and to provide a horizontal reel in which the reel arms shall move toward the cutters in a nearly horizontal path, and shall be turned backward as they pass the cutters, so as not to lift immediately from the grain.

The invention consists in jointing the reel-arms to their radial supports in the manner hereinafter described, and connecting therewith mechanism for turning the arms upon their joints, so as to secure the results mentioned.

It also consists in the combination of certain devices whereby the movements are effected which have been explained above.

The general construction of harvesting-machines is perfectly well known, and therefore I have omitted everything in the drawings except the reel and its support, these parts being all that are necessary to a full understanding of my improvement.

In the drawings, A represents the finger-beam or front edge of the platform of a harvesting-machine, and B the reel-standard, which is mounted in any ordinary way. The reel-shaft C is mounted in the usual way in suitable bearings at the upper end of this standard. Two spiders, D, are attached to the shaft, being provided with the usual radial bars, $b$, for the attachment of the reel-arms at their respective ends; but these radial bars are somewhat shorter than usual. The reel-arms E are attached to short bars $e$, which are joined at their other ends to the outer ends of the spider-bars. Preferably this joint is made in the form of a stop-hinge, as shown in Fig. 2 of the drawings, so that the backward movement of the reel-arms may be limited. In the drawings the construction is such that the backward motion can only proceed so far as to straighten the short bars out and bring them into line with the radial bars of the spider. The reel-arms are preferably provided with teeth $e'$, though this is not absolutely essential.

Bars F are pivoted to suitable supports, $f$, which, as shown in the drawings, may be formed on a hinge secured to the reel-shaft just inside of the inner spider. These bars F project outward between the arms of the spider, and their extreme outer ends are linked respectively to the reel-arms by means of rods G, the rods being attached to the back side of the reel-arms, and connecting these arms with the intermediate bar standing next in rear thereof.

A cam, H, is secured to the reel-standard in any suitable manner, and the reel-shaft passes through it. If desired, the cam may be provided with flanges fitted to the reel-shaft bearing at the upper end of the standard, and forming a kind of bossing for the shaft. The cam on its outer face is provided with a groove, $h$, into which the inner ends of the arms F are inserted, these ends being provided preferably with anti-friction rollers $f'$. The cam is, of course, stationary. Obviously, therefore, when the reel is rotated the pivoted arms F will be vibrated according to the form of the cam-groove along which the inner ends of these arms are caused to pass by the revolution of the reel. This vibration of these pivoted bars will turn the reel-arms on their hinged supports by means of the linked rods connecting them to the outer ends of the bars. Now the cam-groove is formed so that as a reel-arm comes down into the standing grain the outer end of the bar connected thereto is moved inward toward the reel-shaft, thereby pulling the reel-arm gradually forward until, finally, the hinged bars to which it is attached are in a nearly horizontal position, as shown at 1 in Fig. 2 of the drawings, and in which position the reel-arm is very nearly maintained as it sweeps back to the cutters. As the reel-arm begins to rise over the cutters, however, the actuating-bar is vibrated in the opposite direction, thereby turning the reel-arm backward, as shown at 2 in Fig. 2 of the drawings, thus preventing its leaving the grain abruptly, and causing it to carry the grain back upon the platform farther from the cutters than with reels of ordinary construction. As the revolution of the reel continues the reel-arm is moved back still more, until the short bars are finally straightened out in the position shown at 3 in Fig. 2 of the drawings, which position they maintain until just as the arm is to enter the grain. These movements of the reel-arms enable the grain to be gathered and brought to the cutting apparatus in better shape than with the ordinary harvester-reels, while the grain in front of each arm, as it is severed, is moved back away from the cutters and deposited on the platform in good shape for the operation of either a discharging-rake or an elevating apparatus.

It will be noticed that the flexing of the reel-arms on the under side of the reel brings the back side of the arm underneath, so that for the time being it is the under side of the arm. For the proper operation of the teeth on the reel-arms, therefore, they should be arranged to project from the back side of the reel-arm, as shown in the drawings.

The cam and vibrating bars described above provide very simple means of flexing the reel-arms; but other mechanism may be employed for turning the reel-arms on their hinges, and the reel-arms may be connected to their supports in a different manner. If provision is always made for turning them, substantially as described, the main features of my invention will still be retained.

I have described and shown a reel with two spiders, so as to support the arms at each end. The outer spider may be dispensed with, if desired, though I prefer the outer support to give steadiness and strength to the arms. The construction of the joints for the reel-arm supports with stops obviously prevents the arms from being thrown backward and falling backward too far.

I am aware of the patent of Theobald of September 14, 1880, No. 232,155, and I do not broadly claim hinged reel-arms, the leading feature of my invention, as distinguished from that shown in said patent, being the construction whereby I obtain the horizontal movement of the reel-arms.

Having thus described my invention, what I claim as new, and desire to secure by Letters Patent, is—

1. In a horizontal harvester-reel, reel-arms hinged to their supports by short bars, in combination with mechanism whereby the said reel-arms are carried, when operating on the grain, in approximately horizontal line and prevented from abruptly leaving the grain, substantially as described.

2. A reel-shaft, C, in combination with a spider, D, reel-arms E, hinged to the spider-bars, cam H, pivoted bars F, and link-rods G, substantially as described.

3. The hinged swinging reel-arms E, fixed upon the bars $e$, and provided with teeth $e'$, arranged on the back side thereof, in combination with mechanism, as described, for vibrating the said arms as the reel is revolved, whereby approximately horizontal movement is given over the cutter-bar, and the bars E are prevented from rapidly leaving the grain, substantially as described.

WILLIAM R. LOW.

Witnesses:
 VALENTINE VERMILYE,
 PARKER SEDGWICK.